(12) United States Patent  (10) Patent No.: US 8,584,424 B2
Smith et al.  (45) Date of Patent: Nov. 19, 2013

(54) WALL AND SKYLIGHT PANEL SYSTEM WITH ATTACHMENT CLIP

(75) Inventors: Kevin P. Smith, Glenshaw, PA (US); William P. Voegele, Jr., Pittsburgh, PA (US)

(73) Assignee: Extech/Exterior Technologies, Inc., Pittsburgh, PA (US)

( * ) Notice: Subject to any disclaimer, the term of this patent is extended or adjusted under 35 U.S.C. 154(b) by 56 days.

(21) Appl. No.: 13/326,519

(22) Filed: Dec. 15, 2011

(65) Prior Publication Data

US 2012/0151867 A1  Jun. 21, 2012

Related U.S. Application Data

(60) Provisional application No. 61/423,615, filed on Dec. 16, 2010, provisional application No. 61/513,760, filed on Aug. 1, 2011.

(51) Int. Cl.
  *E04B 2/00* (2006.01)
(52) U.S. Cl.
  USPC ............................ 52/588.1; 52/582.1; 52/581
(58) Field of Classification Search
  USPC ........... 52/461, 460, 459, 465, 467, 469, 471, 52/588.1, 582.1, 581, 584.1
  See application file for complete search history.

(56) References Cited

U.S. PATENT DOCUMENTS

| | | | |
|---|---|---|---|
| 2,003,005 A * | 5/1935 | McLean et al. .................... 426/2 |
| 3,574,449 A | 4/1971 | Rosenberg | |
| 4,102,105 A | 7/1978 | Taylor et al. | |
| 4,120,123 A * | 10/1978 | Knudson ............................ 52/86 |
| 4,222,210 A | 9/1980 | Hanstein | |
| 4,361,998 A | 12/1982 | Ellison et al. | |
| 4,495,743 A | 1/1985 | Ellison et al. | |
| 4,570,404 A | 2/1986 | Knudson | |
| 4,575,983 A | 3/1986 | Lott, Jr. et al. | |
| 5,181,360 A | 1/1993 | Shingler | |
| 5,193,321 A | 3/1993 | Edwards | |
| 5,363,624 A | 11/1994 | Cotter | |
| 5,437,129 A | 8/1995 | Konstantin | |
| 5,692,345 A * | 12/1997 | Mogaki et al. ............... 52/483.1 |
| 6,164,024 A | 12/2000 | Konstantin | |
| 6,289,646 B1 | 9/2001 | Watanabe | |
| 6,536,175 B2 * | 3/2003 | Conterno ..................... 52/489.1 |
| 6,845,592 B2 | 1/2005 | Voegele | |
| 7,281,353 B2 | 10/2007 | Konstantin | |
| 7,313,893 B2 | 1/2008 | Voegele | |
| 7,441,379 B2 | 10/2008 | Konstantin | |
| 7,546,708 B2 | 6/2009 | Konstantin | |
| 7,661,234 B2 * | 2/2010 | Voegele, Jr. ..................... 52/466 |
| 7,661,235 B2 | 2/2010 | Stoecker | |
| 7,765,760 B2 | 8/2010 | Konstantin | |
| 7,788,869 B2 | 9/2010 | Voegele | |
| 7,926,236 B2 * | 4/2011 | Konstantin ...................... 52/466 |
| 2009/0044477 A1 | 2/2009 | Simpson et al. | |
| 2009/0107076 A1* | 4/2009 | Kim ............................. 52/582.1 |
| 2009/0293241 A1* | 12/2009 | Voegele, Jr. ..................... 24/457 |

\* cited by examiner

*Primary Examiner* — Jessica Laux
(74) *Attorney, Agent, or Firm* — McKay & Associates, P.C.

(57) ABSTRACT

A base member, clip assembly, and panels forming a panel system with a covered seam. The base member is configured at each building structural support. The clip assembly includes a base clip slidably situated within base member between the seam, the base clip further having a vertical web and various flanges. A retainer clip engages the base clip such that retainer clip, base clip, and base member all make contact with both panels. A batten then snaps into and engages upstanding legs of the panels to further secure the panels at the seam, filling a recess. In an alternative embodiment of the clip assembly, the top of the base clip terminates at L-shaped flanges which lock a slotted, U-shaped retainer clip. In a further embodiment, the top of the base clip terminates at a loop, and the retainer "clip" is formed as a flexible seat.

11 Claims, 7 Drawing Sheets

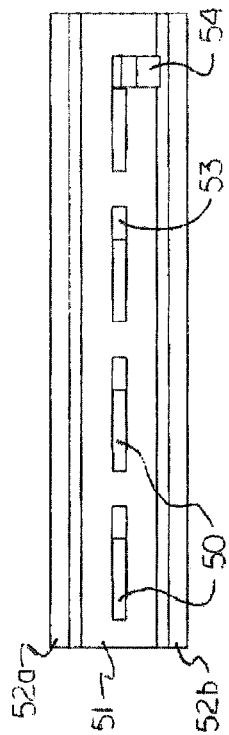
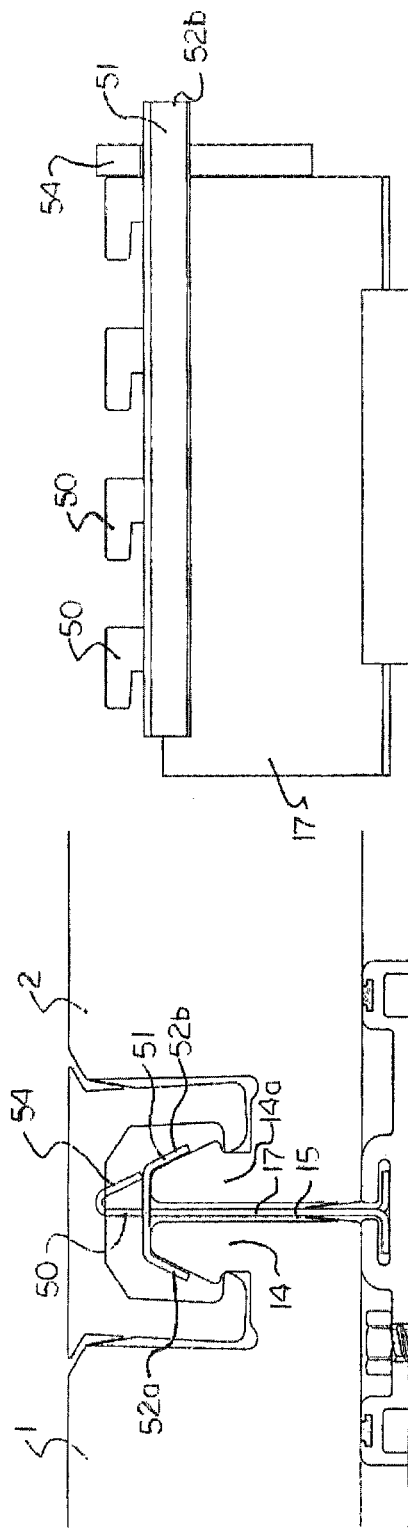

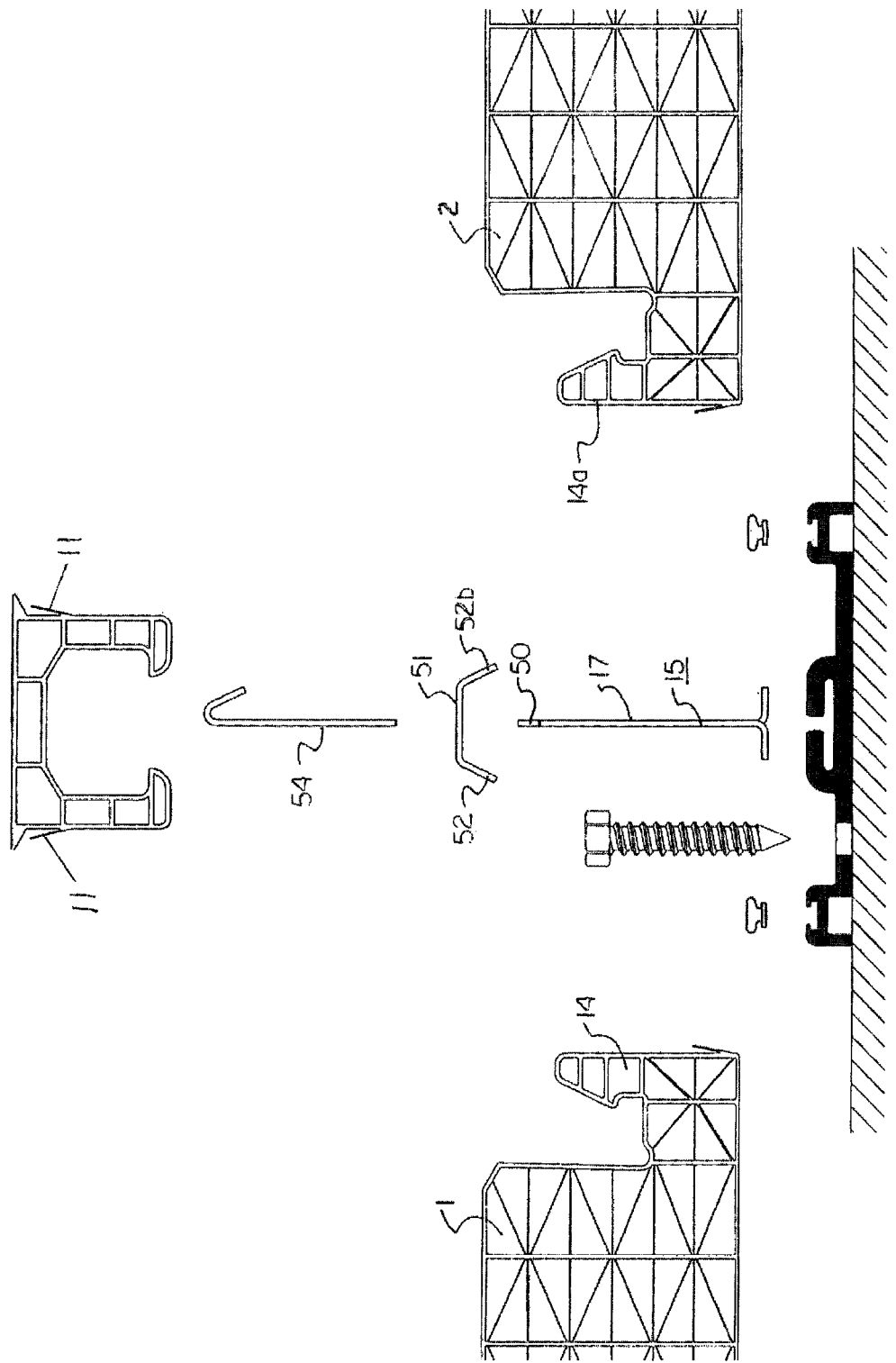

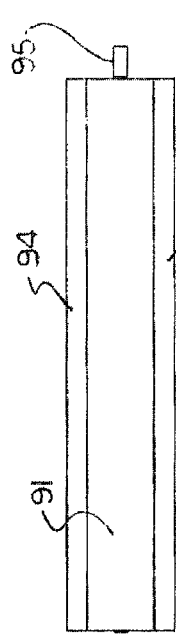
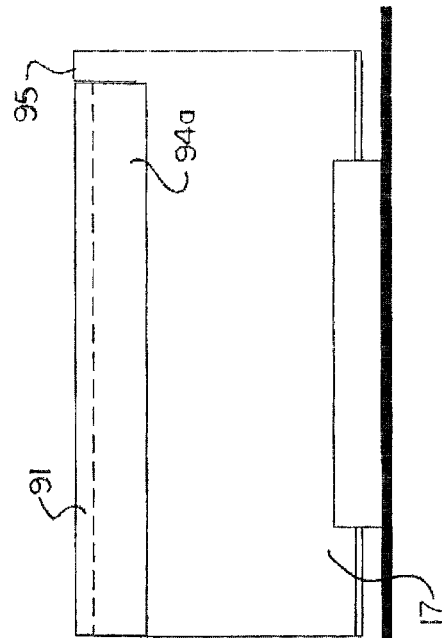
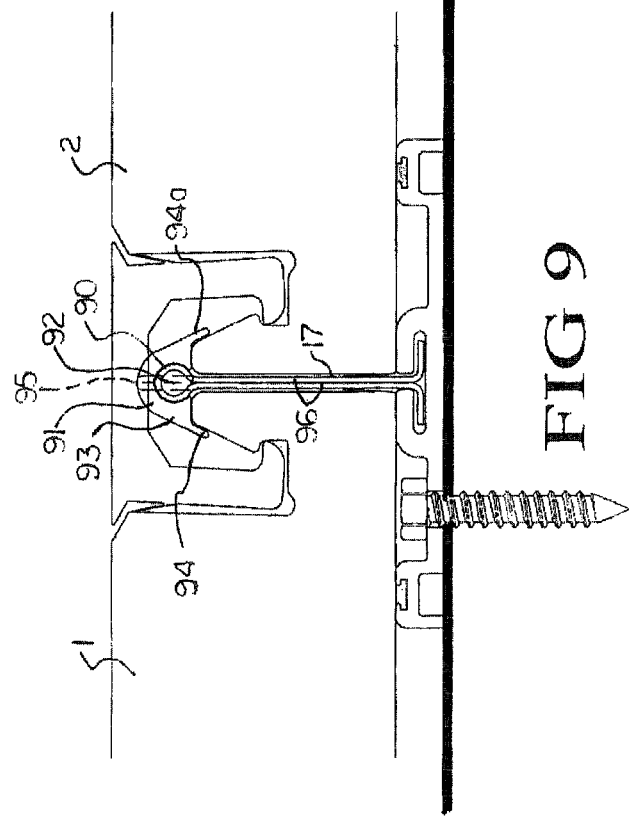
FIG 10
FIG 11
FIG 9

WALL AND SKYLIGHT PANEL SYSTEM WITH ATTACHMENT CLIP

CROSS-REFERENCE TO RELATED APPLICATIONS

The instant application claims benefit of provisional application Ser. No. 61/423,615 filed Dec. 16, 2010 and provisional application Ser. No. 61/513,760 filed Aug. 1, 2011, the contents of both of which are incorporated herein by reference.

BACKGROUND

Insulated translucent wall and skylight panels have become popular and useful because of the well known benefits of natural lighting and the need to save energy via thermally insulated panels. Typical is that a clip assembly is disposed between two panels at 10a seam thereof for joining the panels for use as skylight, roof, or wall panel systems.

For example, U.S. Pat. No. 6,845,592 describes a clip assembly for use with skylight or roof panel systems, which has an upper clip which receives and constrains roof panels, and which is movably attached to mount such that the upper clip can slide in a direction parallel to the seam formed by adjoining roof panels. U.S. Pat. No. 7,546,708 shows a retention clip thr architectural panels, which has a top flange provided on a metal body and having adjacent flange sections, each extending outwardly from a central web to engage panels to hold against forces trying to separate them from each other. U.S. Pat. No. 7,313,893 teaches a panel, e.g. skylight panel, wherein a clip assembly has upper horizontal flanges including holes that are designed to accommodate pins, which extend through holes and inserted via upright body portions of panels. U.S. Pat. No. 6,164,024 describes a glazing panel system for use with rafters and purlins, which has seam flanges whose exterior faces are allowed to continuously bear flush against bearing surfaces between top flange and base of clip. Finally, U.S. Pat. No. 7,765,760 shows a glazing panel system having connectors including transversely extending portions joining two miter depending legs.

Evident in the multitude of panel systems is that installation or replacement time can vary considerably depending on the design. For instance, to replace a panel, typically entire sections of the system have to be removed. Also, many environmental resistance qualities are sacrificed by over-simplifying designs, and insulating properties and other thermal values can be lost with particular designs and materials of panel systems. There is a need then as addressed by the present invention to provide an aesthetically-pleasing panel system which provides extreme thermal insulating value, exceptional resistance to wind uplift, ease of installation and ease of panel replacement.

SUMMARY

The instant invention comprehends generally three main sub-assemblies including a base member, a clip assembly, and a panel system.

The base member is configured at each building structural support to secure two adjoining panels at a seam.

The clip assembly includes a base clip which is slidably situated within base member between the seam, the base clip further having a vertical web and, in one embodiment, a one-sided flange at the top thereof. A retainer clip as part of the clip assembly includes a hemmed and an un-hemmed leg, the un-hemmed leg extending obliquely opposite the hemmed leg to form the clip generally of an inverted-t shape in this first embodiment. Hemmed portion of retainer clip is sufficiently open to engage the base clip flange. Ends of flange are configured so they can be bent upwards to restrict clip in place and prevent longitudinal displacement.

The panels include a first panel and second panel, each panel including an upstanding leg with a detent and both panels joined at the seam. Retainer clip, base clip, and base member all make contact with both panels. Specifically, first panel abuts vertical web of base clip as flange extends over first upstanding leg of first panel. Second panel abuts the other side of the base clip vertical web. Retainer clip is then slid in place with un-hemmed leg of retainer clip extending over second upstanding leg to secure second panel as the hemmed leg slides over and engages the base clip flange and thereby secures the first panel.

When joined, a recess is defined between the panels. A batten having downwardly disposed batten legs then snaps into and engages detents of the upstanding legs of each panel to further secure the panels at the seam, filling the recess. Flexible ridges are disposed within cavities defined between the batten legs and panels to restrict air and water flow through the joint.

In an alternative embodiment of the clip assembly, the top of the base clip terminates at L-shaped flanges which lock a slotted, U-shaped retainer clip which overhangs the panels' upstanding legs. In a further embodiment of the clip assembly, the top of the base clip terminates at a loop, and the retainer "clip" is formed as a flexible seat with a central opening to contain the loop and thereby simultaneously engage the panels.

All in all, a strong clip composed of an aluminum base and retainer elements will provide constraint against wind uplift for both adjoining panels while making it possible to remove and reinstall any single panel without removal of adjoining panels. Also accommodated is lengthwise thermal expansion and contraction of the translucent panels by virtue of the fact that the base clip element is free to slide within the aluminum clip base element.

BRIEF DESCRIPTION OF THE DRAWINGS

FIG. 5 shows an alternative embodiment of the attachment clip as viewed down the seam of the panels.

FIG. 6 shows a top view of the alternative embodiment of FIG. 5.

FIG. 7 shows a side-view of the same alternative embodiment of the attachment clip as viewed across the seam.

FIG. 8 shows an exploded view of the same alternative embodiment of FIG. 5.

FIG. 9 shows a further alternative embodiment of the attachment clip as viewed down the seam of the panels.

FIG. 10 shows a top view of the same further embodiment of FIG. 9.

FIG. 11 shows a side-view of the same further embodiment of the attachment clip as viewed across the seam.

DETAILED DESCRIPTION OF THE PREFERRED EMBODIMENT

The instant invention relates to a translucent multi-walled panel assembly. Although panel system dimensions inherently vary, the instant panel system would be dimensioned preferably from 40 mm to 60 mm in thickness, with widths preferably in the range of 500 mm to 1000 mm and with lengths preferably as long as 50 feet.

Figure 1:
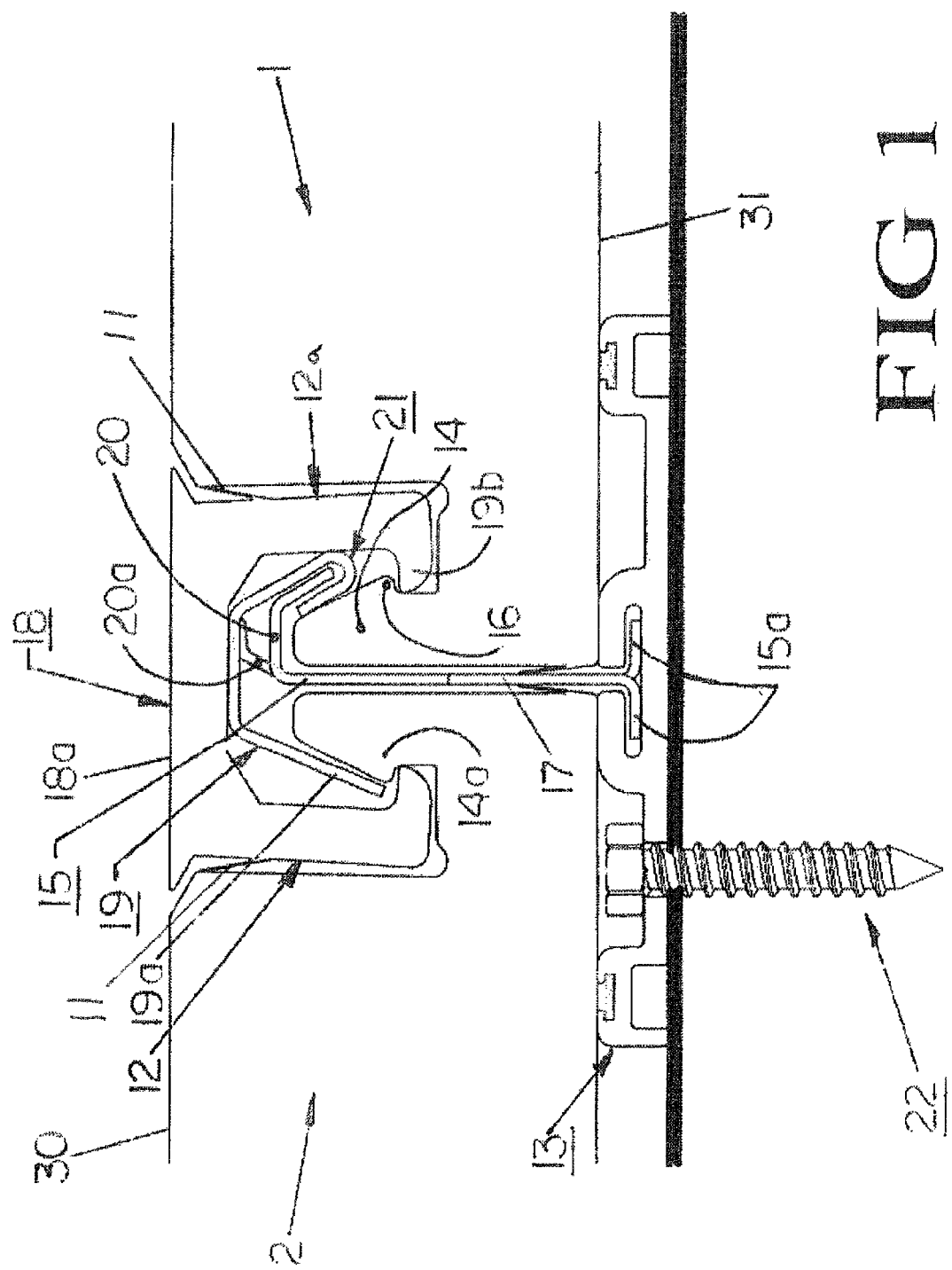
FIG. 1 shows a front view of the instant attachment clip and panel system as viewed down the seam of the panels.
Figure 2:
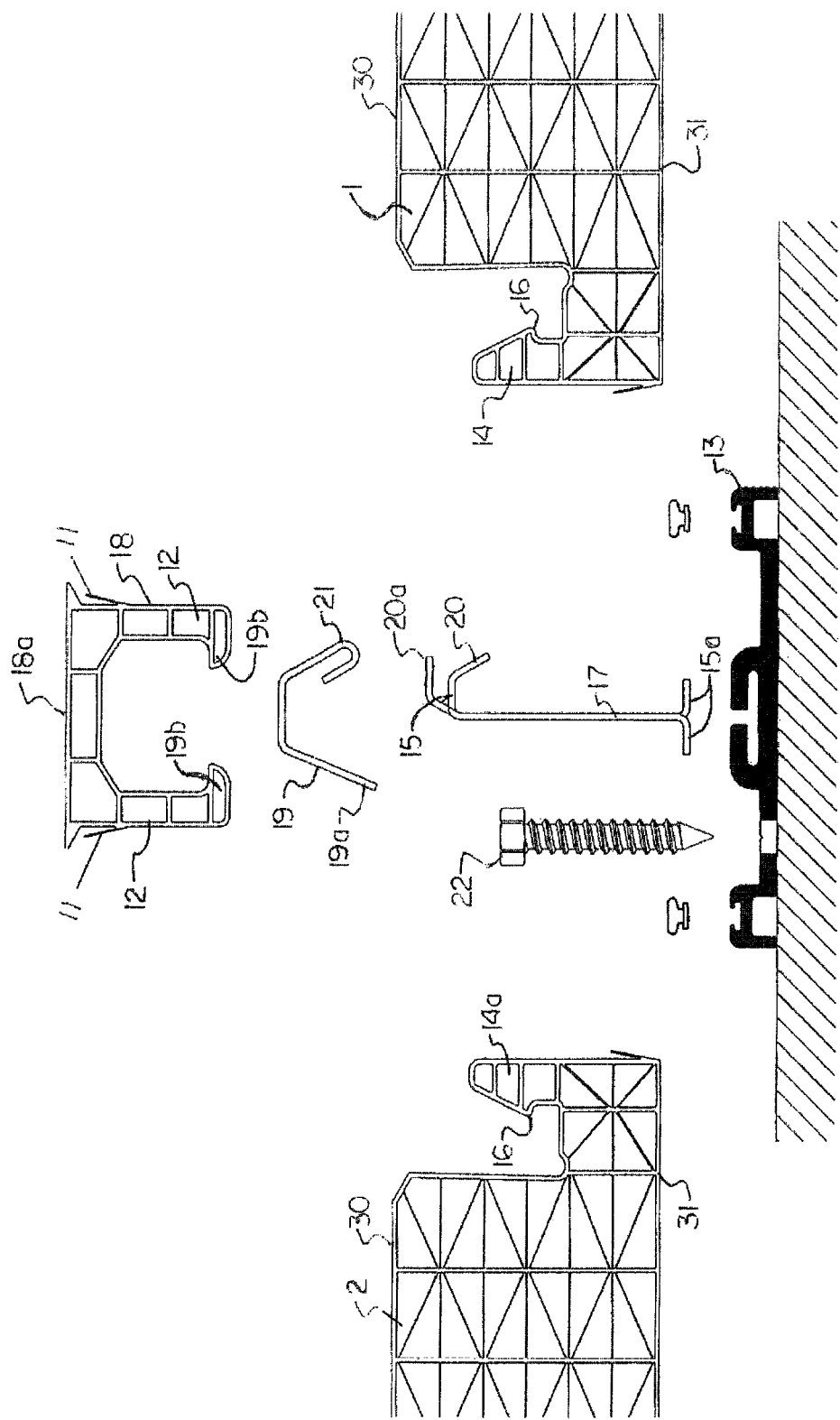
FIG. 2 shows an exploded view of attachment clip and panel system with associated components.
Figure 3:
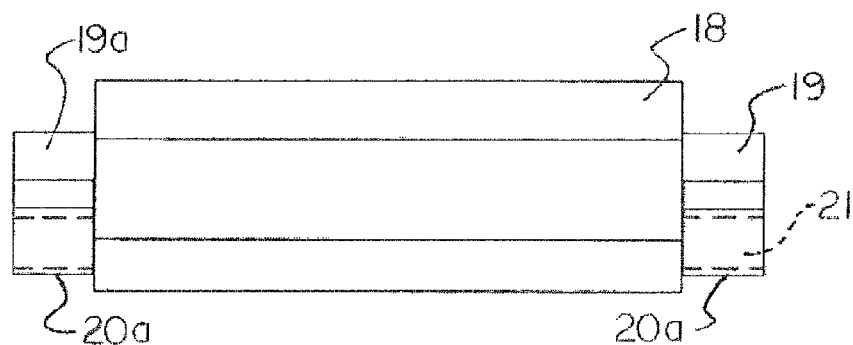
FIG. 3 shows a top view of the instant attachment clip (tabs 20a unbent).
Figure 4:
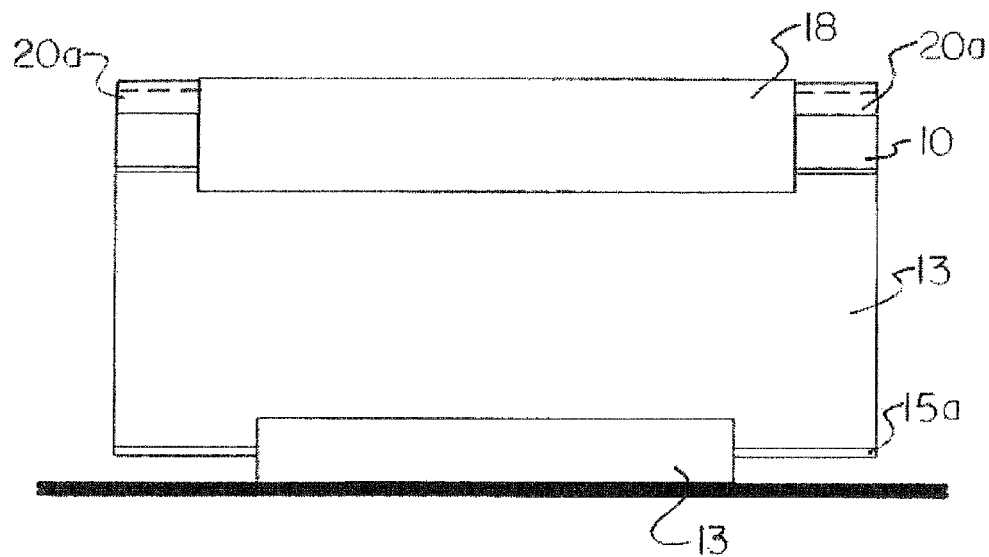
FIG. 4 shows a side-view as viewed across the seam with tabs 20a unbent upwards.

With reference then to FIGS. 1-4, at each building structural support, a base 13 is configured to secure two adjoining panels 1, 2 at a seam. The base 13 is preferably aluminum and similar to that found in U.S. Pat. No. 6,845,592, which is incorporated herein by reference. Base 13 is secured to a building substrate via one or more screw fasteners 22. Other rivets, nails, or means for fastening can be employed to secure the base 13 to the building structural support or substrate. Since in almost all cases more than one seam results because of the use of multiple panels to configure the panel system, "a" as used in the claims means one or more.

A clip assembly is used to attach each adjoining panel 1, 2 at the seam by engaging the panels 1, 2 between and across the seam. Clip assembly as used herein comprises further subassemblies as will be further described, but in all instances the subassemblies will include a base clip 15 with vertical web 17 and some form of retainer subassembly depending on the embodiment, as will be further described.

In a first embodiment and with continued reference to FIGS. 1-4, clip assembly includes a base clip 15 situated within base 13 between the seam, the base clip 15 further having a base flange 15a, a vertical web 17 forming an upright portion extending from the base flange 15a between the seam, and a top flange 20 at the top thereof. The base flange 15a with opposing fingers engage substantially matching channels in the aluminum base 13, the channels being medially defined therein to receive the base flange 15a. The top flange 20 extends from the vertical web 17 at its top and therefore is a single flange directed to one side of the base clip 15, the top flange 20 hooking over the upstanding leg of the first multi-walled panel, as further described.

A curved retainer clip 19 includes a hemmed leg 21 and an un-hemmed leg 19a. Un-hemmed leg 19a extends obliquely opposite hemmed leg 21 to form the clip 19 generally of an inverted-U shape. Hemmed leg 21 of retainer clip 19 is sufficiently open to engage the top flange 20 of the base clip 15. Specifically, the second clip element relative to the base clip 15 is a small bent retainer clip 19, preferably made of stainless steel, particularly 18 gage or 16 gage in thickness. Hemmed leg 21 of retainer clip 19 slidably engages top flange 20. Un-hemmed leg 19a engages second panel 2. Accordingly, the un-hemmed leg 19a is adapted to abut and constrain the second panel and the hemmed leg can engage the top flange 20 while concurrently abutting and constraining the first panel 1, wherein the first panel 1 and the second panel 2 can be secured at the seam.

In this embodiment the retainer clip 19 element is typically 3" long, although it could be longer or shorter. The upright portion or vertical web 17 of the base clip 15 is typically 1" longer than the retainer 19 element, the difference allowing for the establishment of tabs 20a which will maintain engagement but allow for limited longitudinal movement between the main upright base clip 15 and the retainer clip 19. Specifically, the top flange 20 has two ends with proximate notches, cuts, slits or similar means to allow for the manual bending of top flange 20 such that each end therefore is adapted to be bent upwards to restrain the retainer clip 19 from sliding from its engaged and intended position. These ends or tabs 20a of flange 20 are therefore configured to be pulled upwards to fix retainer clip 19 in place and prevent longitudinal displacement.

In all embodiments the panels 1, 2 have features along their edges all wing them to accept a continuous snap-in cellular polycarbonate clip, or batten 18, when joined at the seam. Namely, each panel 1, 2 includes an integral upstanding leg 14, 14a extending upward relative to the inner surface 31. The batten 18 has a pair of downward legs 12, 12a extending from the outer batten face 18a, with each downward leg 12, 12a including an integral lip 19b which is designed to engage the respective detent 16 found in each upstanding leg 14, 14a of the panels 1, 2. For instance the batten 18 "snaps" onto each upstanding leg 14, 14a. As above, each panel 1, 2 has an outer face 30 and an inner surface 31 relative to base 13. The outer face 30 and inner surface 31 therefore define the width of the panels 1, 2. When the batten 18 engages the upstanding legs 14, 14a the outer face of the batten 18 approximates the level of the outer faces 30 of the panels 1, 2 resulting in a somewhat seamless system. In other words, the batten 18 has outer batten face 18a which is substantially aligned with the outer face 30 of each panel 1, 2 when the batten 18 is snapped onto each upstanding leg 14, 14a such that a transition from the outer face 30 to the outer batten face is substantially level. "Substantially" herein is used to denote the transition is level but for small dimensional variances and the allowed natural movement of the panel system.

For the process of joining first panel 1 to second panel 2, first panel 1 abuts vertical web 17 of base clip 15 as top flange 20 extends over first upstanding leg 14. Second panel 12 abuts the other side of vertical web 17 adjacent first panel 1. Retainer clip 19 is then slid in place with un-hemmed leg 19a of retainer clip 19 extending over second upstanding leg 14a to secure second panel 2 as hemmed leg 21 slides over and engages top flange 20 and therefore secures first panel 1. Steel inserts (not shown) may be employed within cavities proximate to the seam to stiffen the assemblage at the seam.

When joined, the panels 1, 2, define a recess in part because the upstanding legs 14, 14a are narrow and terminate short of the miter face 30 (less than the width of the panels). The batten 18 having downwardly disposed batten legs 12, 12a then snaps into and engages detent 16 formed at the lower end of each upstanding leg 14, 14a to fill the recess.

Also when joined and with the batten 18 installed, a pair of cavities result between the batten 18 and each panel 1, 2 at each seam as a result of the transition from the outer face 30 to the outer batten face 18a. The cavities allow the downward legs 12, 12a of the battens 18 to expand when in the course of engaging the panel's upstanding legs 14, 14a. Flexible ridges 11, typically of the same material as the batten 18, are used within the cavities defined integrally as projections along both sides of the panels 1, 2, providing the initial seal against an and water infiltration. For instance, ridges 11 jut outwards away from each downward leg 12, 12a of batten 18 and, being flexible at that point, forcible contact panels 1, 2 to fill each cavity upon placement of the batten 18. It an be envisioned that the same cavities could be filled by elastomeric gaskets or similar separate fills which are not integral to the batten 18. However, such components may complicate the extrusion process, so the ridges 11 are the preferred embodiment.

For installation and use, the retainer clip 19 is installed by sliding it along the length of the top flange 20 of the main base clip 15 while engaging and hooking top flange 20, in so doing providing a new but separate flange 19a (un-hemmed leg) on the other side. This separate, straight un-hemmed flange 19a will constrain the second panel 2 against wind uplift while the original top flange 20 on the upright base clip 15 constrain the first panel 1 described above.

Because the retainer clip 19 is not installed until an adjoining panel is in place, the adjoining panel can be installed directly against the substrate by virtue of the fact that the base clip 15 contains only one flange 20 and that flange 20 is directed away from the adjoining panel. This is a critical design factor. When the new (adjoining) panel is placed against the aluminum base 13, the retainer clip 19 can be slid onto the flange 20 of the base clip 15 portion and slid along the base clip flange 20 until it is centered on that clip portion. At that point, the tabs 20a of the flange of the base clip 15 can be bent to restrain the retainer clip 19 from sliding from its resting and intended position.

With reference to FIGS. 5-8, shown is an alternative embodiment of the clip assembly as modified from that shown by FIGS. 1-4. Namely, in this first alternative embodiment vertical web 17 of base clip 15 includes one or more (or multiple as shown) L-shaped flanges 50 at the top thereof which lock a slotted retainer clip 51. Specifically, shown is a generally U-shaped, slotted retainer clip 51 having two legs 52a, 52b. Each leg 52a, 52b is configured to overhang and engage the panels 1, 2 respectively at each upstanding panel leg 14, 14a, as shown and in similar fashion as the first embodiment although neither leg herein is hemmed or shortened. Slotted retainer clip 51 has one or more (or multiple as shown) openings or slots 53 through which the flanges 50 formed at the top of the base clip 15 vertical web 17 can pass. Upon placement of the slotted retainer clip 51 down over the base clip 15, the slotted retainer clip 51 can be slid such that horizontal portions of flanges 50 now overhang retainer clip 51. Slotted retainer clip 51 is then "locked" into place by way of a clip tab 54 which is inserted down through at least one of the same slots 53 to abut the respective flange 50 and restrain the slotted retainer clip 51 from sliding from its resting and intended position as shown in FIGS. 6 and 7.

Figure 12:
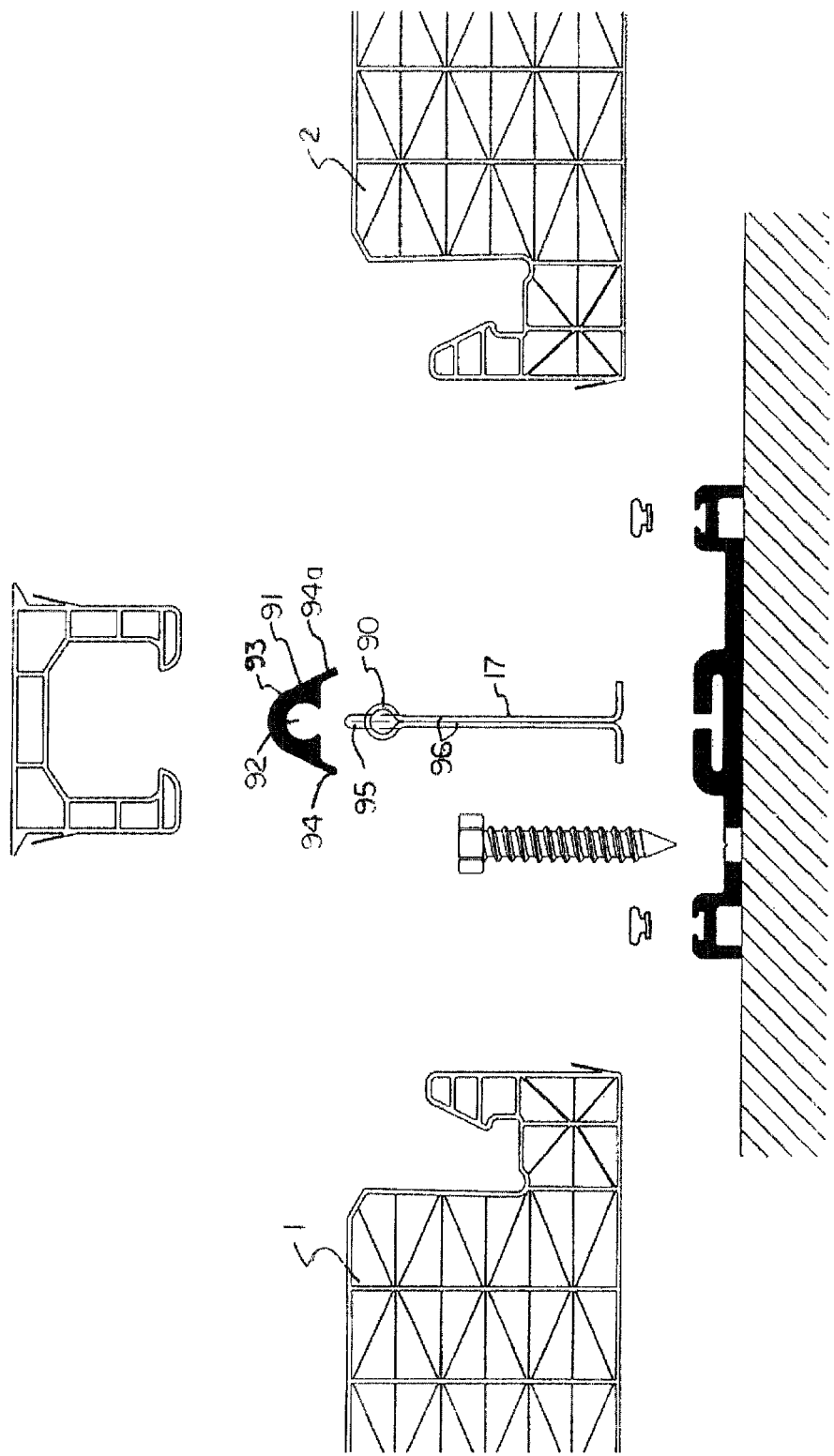
FIG. 12 shows an exploded view of the same further embodiment of FIG. 9.

With reference to FIGS. 9-12, shown is a further embodiment of the clip assembly. However, in this embodiment a substantial part of vertical web 17 terminates at a loop 90, the vertical web 17 of base clip 15 no being formed as a pan of abutting members 96 which result from the vertical web 17 being "folded" at its top to form the loop 90. The retainer "clip" herein is a retainer formed as an interlocking seat 91. Seat 91 has a central opening 92 defined by its integral body 93 shaped generally as an inverted "U". Integral body 93 has a pair of seat legs 94, 94a which respectively overhang and engage panels 1, 2 similar to the previous embodiments (at upstanding legs). Rear top of vertical web 17 remains intact and upright in lieu of loop 90 (thereby defining "substantial part of top" as it relates to loop 90) to form extension 95, and therefore extension 95 extends upward a greater distance than loop 90. Accordingly, seat 91 snaps onto and engages the top loop 90 to thereby lock each panel 1, 2 at the seam as shown, each panel 1, 2 being restrained from sliding from its resting and intended position due to the frictional engagement of seat 91 and loop 90 as well as extension 95 abutting seat 91.

All in all, a strong clip composed of an aluminum base and retainer elements will provide constraint against wind uplift for both adjoining panels while making it possible to remove and reinstall any single panel without removal of adjoining panels. Also accommodated is lengthwise thermal expansion and contraction of the translucent panels by virtue of the fact that the base clip element is free to slide within the aluminum clip base element.

We claim:

1. A panel system, comprising:
   a first panel and an adjacent second panel, each said panel including an integral upstanding leg joined at a seam, each said panel having an outer face and an inner surface defining a width of each said panel with each said upstanding leg extending upward relative to said inner surface a distance of less than said width to define a recess between each said first panel and said second panel when each said upstanding leg is joined;
   a clip assembly attached to each said upstanding leg between and across said seam to secure each said panel, wherein said clip assembly includes a base clip including a base flange and a vertical web extending from said base flange, said vertical web adapted to be disposed between said first panel and said second panel at said seam, and wherein a top flange extends from said vertical web directed to one side of said base clip;
   wherein said clip assembly includes a retainer clip, said retainer clip further comprising a hemmed leg and an un-hemmed leg extending obliquely opposite said hemmed leg to form said retainer clip generally of an inverted U-shape, said un-hemmed leg adapted to abut and constrain said second panel, said hemmed leg curved and sufficiently open such that said hemmed leg can engage said top flange while concurrently abutting and constraining said first panel; and,
   a batten adapted to snap onto each said upstanding leg within said recess to fill said recess and cover said clip assembly, said batten having an outer batten face, said outer batten face approximating a level of said outer face of each said panel so as to be substantially aligned with said outer face of each said panel when snapped onto each said upstanding leg such that a transition from said outer face to said outer batten face is substantially level.

2. The panel system of claim 1, wherein each said upstanding leg includes a detent defined at a lower end thereof.

3. The panel system of claim 2, wherein said batten further comprises a pair of downward legs extending from said outer batten face, each said downward leg including an integral lip for engaging said detent to further secure said batten to each said upstanding leg.

4. The panel system of claim 3, further comprising a flexible ridge formed integral with each said downward leg jutting outward away from each said downward leg to be disposed within a cavity formed as a result of said transition and forcibly contact each said panel to provide a seal within said cavity.

5. The panel system of claim 1, wherein said top flange has two ends fanned as tabs, each said tab adapted to be bent upwards to restrain said retainer clip.

6. The panel system of claim 1, wherein said vertical web includes multiple L-shaped flanges at a top thereof.

7. The panel system of claim 6, wherein said clip assembly includes a slotted retainer clip, said slotted retainer clip being generally U-shaped comprising two legs, each said leg adapted to overhang and engage a respective one of said panels at said seam, said slotted retainer clip having multiple slots defined therein through which said L-shaped flanges can pass.

8. The panel system of claim 7, further comprising a clip tab adapted to be inserted down into one of said slots to abut a respective one of said L-shaped flanges such that said slotted retainer clip can be restrained.

9. The panel system of claim 1, wherein a substantial part of said vertical web terminates at a loop.

10. The panel system of claim 9, wherein said clip assembly includes a retainer, said retainer being formed as a flexible seat having a central opening defined therein, said seat including a pair of seat legs, each said seat leg adapted to overhang and engage a respective one of said panels at said seam, said opening adapted to receive said loop thereby said seat can snap onto engage said loop.

11. The panel system of claim 10, wherein a rear top of said vertical web is formed as an extension extending upwards a greater distance than said loop adapted to engage said seat such that said retainer can be restrained.

* * * * *